3,766,138
POLYIMIDES
James V. Crivello, Mechanicville, N.Y., assignor to
General Electric Company
No Drawing. Filed July 16, 1971, Ser. No. 163,410
Int. Cl. C08g 20/32
U.S. Cl. 260—47 CZ    11 Claims

ABSTRACT OF THE DISCLOSURE

Polyamides are obtained from the reaction of an oligimeric bis-imide and a sulfide such as hydrogen sulfide, an organic dithiol, or mixtures of such sulfides in the presence of a proton donor. These polymeric compositions have uses in packaging and molding applications, as insulating materials, and as membranes for the separation of gases.

---

This invention is concerned with polyimide compositions. More particularly, the invention relates to a polymer composed of recurring structural units of the formula (I)

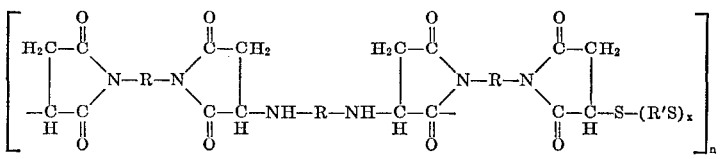

where the R's can be the same or different divalent organic radicals selected from the class consisting of divalent hydrocarbon radicals of from 1 to 40 carbon atoms and divalent groups consisting of two aryl residues attached to each other through the medium of a member selected from the class consisting of an alkylene radical of from 1 to 10 carbon atoms

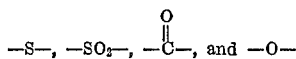

R' can be any divalent organic radical, $n$ is a whole number in excess of 1, for instance, 2 to 10,000 or more, and $x$ is 0 or 1.

The invention also includes methods for making polymeric compositions of Formula I by effecting reaction, in the presence of a proton donor, between a bis-maleimide of the general formula (II)

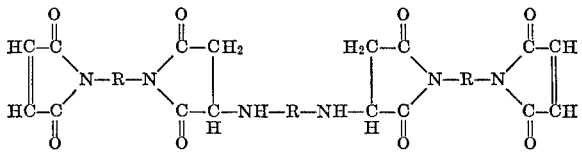

with a sulfide (hereinafter so generically identified) selected from the class consisting of $H_2S$ and organic dithiols of the general formula (III)         HS—R'—SH advantageously in the presence of a solvent for one or both of the reactants and for the reaction product, where R and R' have the meanings given above. The above-identified compositions of Formula I can also be made by forming an aqueous emulsion of the bis-imide in which state the bis-imide is reacted with the sulfide.

When bis-maleimides of Formula II are reacted with hydrogen sulfide, for example, one obtains a gelled, substantially infusible and insoluble mass. This resulting product has little if any commercial utility. Unexpectedly, I have discovered that when a bis-maleimide of Formula II is reacted with hydrogen sulfide, in the presence of a proton donor (i.e. in the presence of an acidic hydrogen ion), the reaction between the bis-maleimide and hydrogen sulfide proceeds smoothly to give soluble, fusible polymers.

The term "proton (H+) donor" is intended to mean any compound, whether organic or inorganic, capable of ionizing to give a proton and includes, for instance, inorganic acids (e.g., HCl, $HClO_4$, $H_3PO_4$, $H_2SO_4$, etc.); organic carboxylic acids (e.g., formic acid, acetic acid, propionic acid, benzoic acid, isobutyric acid, trifluoroacetic acid, maleic acid, etc.); organic compounds containing weakly acidic hydrogen atoms in the form of nuclearly bonded hydroxyl groups (e.g., phenol and substituted phenols, including mesitol, cresol, xylenol, hydroquinone, etc.); acidic inorganic and organic salts (e.g., ammonium chloride, ammonium sulfide, trialkyl ammonium salts, for instance, tributyl ammonium chloride, etc.); etc.

The amount of the proton donor can be varied widely. Generally, it is present in an amount sufficient to suppress the competing anionic polymerization leading to the gel stage. Based on the weight of the bis-maleimide, the proton donor may range from 0.5 to 10%, by weight, or more. If desired, the acidic proton donor can be present in larger amounts so as also to act as the reaction medium, for instance, in connection with the use of materials such as acetic acid, cresol, etc.

The bis-imides of Formula II may be prepared by first forming the bis-imide (IV)

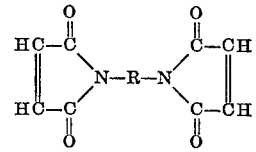

by effecting reaction between a diamino compound of the formula (V)            $NH_2—R—NH_2$ and maleic anhydride where R has the meaning given above. In practice, the compositions of Formula IV may be obtained by effecting reaction in a well-known fashion between 2 mols of maleic anhydride and the diamino compound of Formula V.

The bis-imides of the General Formula IV can be varied widely depending on the kinds of organic radicals which are present therein. Among the divalent groupings which R may broadly and more specifically represent are, for instance, divalent saturated alkylene radicals of up to 40 carbon atoms, for instance, 1 to 10 (e.g., ethylene, propylene, butylene, isopropylidene, hexylene, cyclohexylene, etc.), the divalent radical of diethylene oxide of the formula $—CH_2—CH_2—O—CH_2—CH_2—$ etc.); arylene including various isomers thereof (e.g., m-phenylene, p-phenylene, p,p'-biphenylene, m,m'-biphenylene, dichlorophenylene, biphenylene methylene of the formula

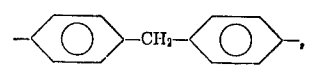

biphenylene oxide, biphenylene sulfone, biphenylene sulfide, keto biphenylene of the formula

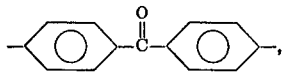

etc. Obviously, the arylene radicals may be attached to nitrogens through the ortho, meta or para positions.

Typical examples of the bis-imides of Formula IV are, for instance,

N,N'-ethylene-bis-maleimide,
N,N'-m-phenylene-bis-maleimide,
N,N'-p-phenylene-bis-maleimide,
N,N'-hexamethylene-bis-maleimide,
N,N'-p,p'-diphenylmethane-bis-maleimide (hereinafter referred to as "BMI"),
N,N'-p,p'-diphenylether-bis-maleimide,
N,N'-p,p'-diphenylthioether-bis-maleimide,
N,N'-p,p'-diphenylsulfone-bis-maleimide,
N,N'-4,4'-dicyclohexylmethane-bis-maleimide,
N,N'-m-xylylene-bis-maleimide,
N,N'-p,p'-benzophenone-bis-maleimide,
N,N'-(3,3'-dichloro-p,p'-biphenylene) bis-maleimide,
N,N'-p,p'-diphenylmethane-bis-(methylmaleimide),
N,N'-p,p'-diphenylmethane-bis-(dimethylmaleimide)

which can be made from pyrocinchonic anhydride and 4,4'-diaminodiphenyl methane, etc. Halogenated derivatives of such bis-imides where halogen is on an aryl nucleus can also be employed without departing from the scope of the invention, e.g., N,N'-(3,3'-dichloro-4,4'-biphenyloxy) - bis - maleimide, N,N'-(3,3'-dibromo-4,4'-diphenylmethane)-bis-maleimide, etc. Mixtures of the bis-imides can also be used if desired.

The above bis-imides of Formula IV can be prepared by reacting two moles of maleic anhydride (or other methyl-substituted maleic anhydride required for making the bis-imides of Formula IV) with one mole of a suitable diamino compound. Mixtures of anhydrides can be used if desired. Typical of the diamino compounds which may be employed for making the bis-imides of Formula IV may be mentioned, for instance, meta-phenylene diamine;
para-phenylene diamine;
4,4'-diamino-3,5,3',5'-tetramethyldiphenyl methane,
4,4'-diamino-diphenyl propane;
4,4'-diamino-diphenyl methane;
4,4'-diamino-diphenyl sulfide;
4,4'-diamino-diphenyl sulfone;
3,3'-diamino-diphenyl sulfone;
4,4'-diamino-diphenyl ether;
4,4'-diamino-3,5,3',5'-tetrachloro-diphenyl methane,
1,5-diamino-naphthalene;
3,3'-dimethyl-4,4'-diamino-biphenyl;
3,3'-dimethoxy benzidine;
2,4-bis-(beta-amino-t-butyl) toluene;
bis-(para-beta-amino-t-butylphenyl) ether;
para-bis-(2-methyl-4-amino-pentyl) benzene;
para-bis-(1,1-dimethyl-5-amino-pentyl) benzene;
α,α'-diamino-m-xylylene;
α,α'-diamino-p-xylylene;
bis(4-amino-cyclohexyl) methane;
hexamethylene diamine;
heptamethylene diamine;
octamethylene diamine;
nonamethylene diamine;
decamethylene diamine;
3-methylheptamethylene diamine;
4,4-dimethylheptamethylene diamine;
(VI)
2,11-diamino-dodecane;
1,2-bis-(3-amino-propoxy) ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane;
and mixtures threeof.

Having obtained the bisimide of Formula IV, the bis-maleimides of Formula II are then prepared by effecting reaction between the bisimide of Formula IV with a diamino compound of Formula V, many examples of which have been given above, under such conditions that the oligomer of Formula II is obtained. This is advantageously accomplished by effecting contact between one mol of the organic diamine of Formula V and about two mols of the bisimide of Formula IV in the presence of an effective amount of an acidic catalyst including organic carboxylic acids, particularly mineral acids as well as specific acidic materials such as fluoroboric acid. Other acids which may be employed for the purpose are propionic acid, chloroacetic acid, trichloroacetic acid, perchloric acid, hydrobromic acid, oxalic acid, etc. The first catalyst often can be employed as a solvent for the mixture of the organic diamine and the bisimide reactant of Formula IV.

Generally the bisimide of Formula IV and the organic diamine of Formula V are contacted in the presence of the acid catalyst while maintaining the temperature in the range of between about 25° C. to 175° C. Effective results can be achieved in the absence of organic solvents particularly where the acid catalyst is utilized as the solvent. If desired a suitable organic solvent such as benzonitrile, acetonitrile, dimethylformamide, N-methyl pyrrolidone, etc. can be employed to facilitate contact between the reactants and to recover the final product. The proportion of the organic diamine to the bisimide of Formula IV to form the oligomer of Formula II should vary within fairly limited ranges. For optimum results, one employs a molar ratio of 2 mols of the bisimide of Formula IV per mol of the organic diamine of Formula V. A slight molar excess of the bisimide of Formula IV (about a 0.001 mol excess) can be employed if desired to effect completion of the reaction.

At temperatures between the range of 25° C. to 80° C., the reaction time can be as long as 2 to 3 hours or more. In some instances depending on such factors as the particular reactants employed, the acid catalyst, etc., effective results can be achieved at ambient temperatures or under reflux conditions where the acid catalyst is employed in amounts sufficient to serve additionally as a solvent for the reactants. In particular instances, effective results can be achieved with as little as 0.1%, by weight, of the acid catalyst based on the total weight of the reaction mixture.

Recovery of the oligomer of Formula II can be achieved by standard methods such as precipitation with an appropriate liquid such as water, acetone, or methanol, etc. The particular organic diamines which may be employed are the same ones which can be used in making the bisimide of Formula IV.

The following examples describe the preparation of selected oligomers of Formula II prepared in accordance with the procedures outlined above.

EXAMPLE 1

This example illustrates the preparation of an oligomer having the formula

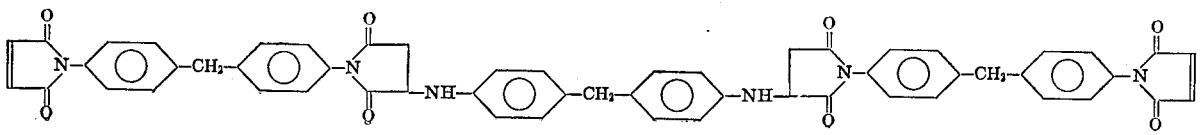

More particularly, to a reaction vessel equipped with a stirrer, reflux condenser and thermometer were added 3.96 grams (0.02 mol), 4,4'-diaminodiphenylmethane, 14.3 grams (0.04 mol) BMI, and 200 ml. glacial acetic acid. The reaction mixture was heated to a reflux temperature (about 114° C.) and maintained at this temperature for two hours. At the end of this time, the product of the above Formula VI had precipitated. This material was filtered, ground to a fine powder, washed with water and dried to give 18.1 grams of the desired oligomer (99.2% yield) having a softening point of about 154° C. The identity of this product was established by infrared and NMR spectra. Elemental analyses as shown below also established the fact that the desired product was obtained. Found (percent): C, 71.7; H, 4.79; N, 8.70. Calculated (percent): C, 72.2; H, 4.63; N, 9.18.

EXAMPLE 2

This example shows a preparation of an oligomer having the formula (VII)

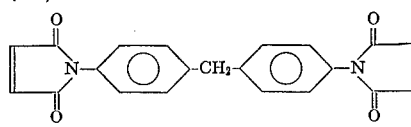
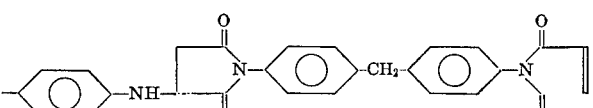

Employing a reaction vessel and procedure similarly as in Example 1, 35.8 grams (0.1 mol) BMI, 10.0 grams (0.05 mol) 4,4'-diaminodiphenyl ether, 100 ml. distilled cresol and 1 ml. acetic acid were mixed together and heated at 120 C. under a nitrogen atmosphere for 15 hours. The oligomer was precipitated by adding methanol, washed, filtered and extracted with methanol and finally dried in vacuum to give 39.6 grams of a product of Formula VII having a softening point within the range of 190–210° C. The identity of the oligomer of Formula VII was established by the following elemental analyses. Found (percent): C, 70.1; H, 4.5; N, 9.2. Calculated (percent): C, 71.84; H, 3.97; N, 9.20.

EXAMPLE 3

In this example, an oligomer of the formula (VIII)

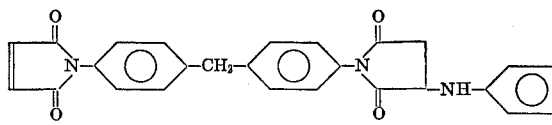
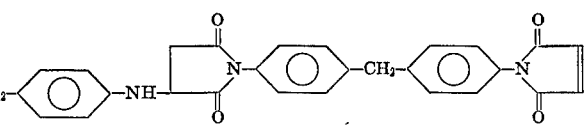

was prepared as follows. Employing the same procedures as described in the aforegoing two examples, 12.4 grams (0.05 mol) 4,4'-diaminodiphenyl sulfone, 35.8 grams (0.10 mol) BMI, 100 ml. cresol and 1 ml. glacial acetic acid were mixed together and the reaction mixture heated at 100–110° C. for about 15 hours. At the end of this time, the oligomer was precipitated with methanol, filtered, washed and extracted overnight with ethanol and dried in vacuum to give about an 80% yield of the above-identified oligomer of Formula VIII, having a softening point within the range of 155° C.–173° C. The identity of the oligomer was established by the following elemental analyses. Found (percent): C, 69.1; H, 4.1; N. 7.5. Calculated (percent): C, 67.2; H, 4.1: N. 8.7.

More complete directions for preparing other compositions within the scope of Formula II may be found disclosed in my copending application, Ser. No. 23,491, filed Mar. 27, 1970 and assigned to the same assignee as the present invention. This latter application is concerned primarily with making polymers from bis-imides and polyamines, but some of the procedures described in this patent application are applicable to making the oligomers of the instant invention.

The organic dithiols which can be employed are not critical and can be any one of those which have at least two free thiol (—SH) groups present. Generally the organic dithiol should be free of primary or secondary aliphatic amine groups. Among such organic dithiols which can be employed, including dithiols containing a divalent alkylene radical of from 2 to 20 carbon atoms, are, for instance, 1,2-ethanedithiol
1,3-propanedithiol
2-methyl-2,4-pentanedithiol
1,6-octanedithiol
1,6-hexanedithiol
1,10-decanedithiol
1,18-octadecanedithiol
1,20-eicosanedithiol
1,38-octatriocontanedithiol
3,6-dioxa-1,8-octanedithiol
1,4-di(3-mercaptophenyl)butane
2-mercaptoethyl-3-(2-mercaptoethyl)phenylsulfide
dithioresorcinol
dithioresorcinol
3-(2-mercaptoethyl)-6-(mercaptomethyl)pyridine
2,5-dimercapto-1,3,4-thiadiazole
1,2,4-thiadiazole-3,5-dithiol
ethylene glycol bis-(mercaptoacetate)
beta-mercaptoethyl ether
2-mercaptoethyl sulfide
3,4-dimercaptotoluene
2,3-dimercaptopropanol

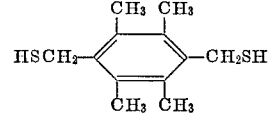

The reaction of the sulfide and the bis-imide (or mixtures of bis-imides) of Formula II may be carried out by merely mixing the ingredients together at room temperature and permitting the reaction to proceed whereby the exothermic heat of reaction may increase the temperature up to 40 to 50° C. Heating in the range of about 50 to 150–200° C. for a length of time required to obtain the desired polymer can also be used if it is desired to accelerate the reaction. Generally, temperatures on the order of about 50° to 150° C. are adequate for the purpose.

Ordinarily, it is desirable to effect reaction between the bis-imide and the sulfide in the presence of a solvent which is inert to the reactants and the reaction product and yet is a solvent for at least one of the reactants and certainly for the reaction product. Typical of such solvents which may be employed for the purpose are benzene, xylene, chlorobenzene, trichlorobenzene, cresol (including mixtures of cresols), N-methyl-2-pyrrolidone, dimethylformamide, etc. The choice of solvent is not critical and any one which satisfies the above conditions of inertness and solvation can be advantageously used. On a weight basis, the solvent may comprise from 1 to 50 or more parts of the solvent per part of the reactant or reactants. Generally, when using hydrogen sulfide, it is advisable to dissolve the bis-imide in a suitable solvent and then pass hydrogen sulfide gas into the solution.

Although the reaction betwen the bis-imide and sulfide proceeds fairly well under many conditions, I have found that the incorporation of certain catalyst materials markedly improves the rate of reaction and the time in which optimum yields are obtained. Among such catalysts which may be mentioned are, for instance, tertiary amines, for example, triethyl amine, tri-n-butylamine, etc. Other catalysts which have been found useful particularly when employing a two-phase emulsion system in which the monomer is dissolved in a solvent, such as cresol, and the catalyst is dissolved in water and the total mixture emulsified with emulsifying agents such as carboxy methyl cellulose include sodium carbonate, potassium carbonate, sodium bicarbonate, etc. Generally, when polar solvents such as dimethylformamide, N-methyl-2-pyrrolidone, dimethyl sulfoxide, etc., are employed, catalysts are normally not needed to effect the desired reaction.

The amount of catalysts used can vary widely. Generally no more should be employed than is necessary to effect optimum completion of the reaction. Ordinarily, no more than 0.01%, by weight, of the catalyst, based on the weight of the bis-imide is required, and usually amounts of the order of 0.0001% to 0.001%, by weight, of the catalyst, based on the weight of the bis-imide, are sufficient.

The amount of sulfide used should be at least equal in molar concentration to the mols of bis-imide employed. Thus, for higher molecular weight products, there should be employed about 1 mol or even slightly more than 1 mol (to insure completion of the reaction) of the sulfide per mol of the bis-imide. The rate of passage of $H_2S$ is not critical and can be varied widely when the latter is used. Generally, from 1 to 10 mols, per mol bis-imide is satisfactory.

After obtaining the polymer which may require reaction for times ranging from about 5 minutes to 2 to 3 hours or more, the solution of the polymer is treated with a non-solvent such as water or a lower alkanol, such as methanol, to precipitate the polymer and the polymer can then be isolated in well-known manner and used for whatever purpose intended. In addition to being soluble in many solvents referred to above, particularly the cresols, these polymers are usually soluble in other solvents such as dimethylformamide, dimethylsulfoxide, etc. The fact that such polymers are soluble in cresol makes them advantageously useful as coating compositions for electrical conductors whereby the conductor can be passed through the cresol solution of the polymer and the solvent is driven off by heat and the polymer on the conductor core cured at elevated temperatures of the order of about 150–300° C. for times ranging from 5 minutes to 1 hour. The polymers obtained in this fashion are usually infusible and insoluble.

In addition to the use of heat alone, the acceleration of the polymers to the thermoset, i.e., the infusible and insoluble state, can be accelerated by the employment of small amounts of organic peroxides or other free radical producing agents normally used to accelerate polymerization. Among such organic peroxides may be mentioned, dicumyl peroxide, benzoyl peroxide, tertiary butyl perbenzoate, tertiary butyl hydroperoxide, azo-bisisobutyronitrile, etc. Generally the amount of cure accelerator employed for the purpose can range from about 0.01 to as high as 5 percent or more, by weight, based on the weight of the polymer.

In addition to the foregoing mixture of ingredients, it is possible to blend the polymer of Formula I with other polymers and resins in amounts ranging from about 1 to 75 percent or more, by weight, of the polymer based on the total weight of the polymer of Formula I and the other polymeric ingredient. Included among such polymers may be mentioned polyolefins (e.g., polyethylene, polypropylene, etc.) polystyrene, polyphenylene oxides such as shown in U.S. 3,306,875, epoxy resins such as shown in U.S. 2,840,540, polycarbonate resins such as shown in U.S. 3,028,365, silicone resins such as shown in U.S. 2,258,218–222, phenolaldehyde resins, polyamide resins such as shown in U.S. 3,179,633–634, polyarylene polyethers such as shown in U.S. 3,332,909, etc., many of which are well-known and well-documented in the art.

In order that those skilled in the art may better understand how the present invention may be practiced, and how the polymers of Formula I can be prepared, the following examples are given by way of illustration and not by way of limitation.

The intrinsic viscosities recited in the following examples were measured in dimethylformamide at 25° C.

EXAMPLE 4

In this example, 5 grams of the oligomer of Example 1 (Formula VI) were dissolved in 50 ml. cresol together with about 2 drops of tetramethylethylenediamine as a catalyst. Hydrogen sulfide gas was passed through the cresol solution of the oligomer for about 1 hour at an even rate of approximately 1 liter of hydrogen sulfide during this period while the temperature of the solution was maintained at around 58° C. At the end of this passage of hydrogen sulfide, a highly viscous reaction mixture was obtained which was then precipitated with acidified methanol. The solid polymer thus resulting was removed by filtration, extracted with hot methanol and dried to yield a polymer of intrinsic viscosity of 0.58 dl./gram and composed of recurring structural units of the formula

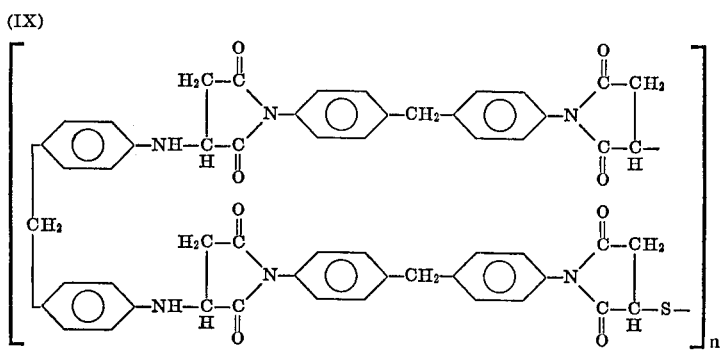

(IX)

where $n$ is a whole number in excess of 1.

EXAMPLE 5

Employing the same procedure and equipment as described in Example 4, 5 grams (0.0051 mol) of the oligomer of Example 3 (Formula VIII) was dissolved in 50 ml. cresol, 2 drops of tetramethylethylene diamine added as a catalyst and hydrogen sulfide passed similarly as in Example 4 at a temperature of about 25° C. After working up the polymer in the same manner as was done in Example 4, a light, tan, resinous product was obtained having an intrinsic viscosity of 0.25 dl./gram. Analysis of the polymer indicated that it was composed of recurring structural units of formula

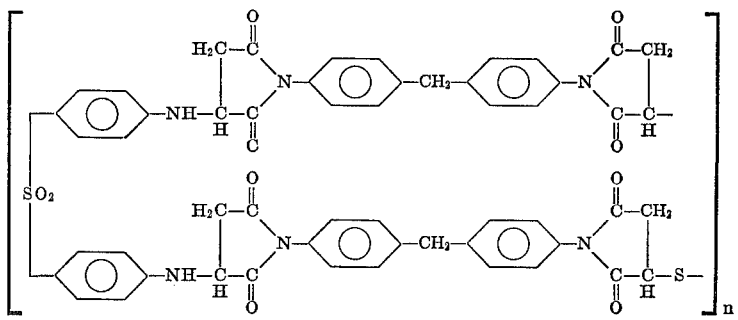

where $n$ is a whole number greater than 1 as evidenced by the following analyses. Found (percent): C, 63.2; H, 4.23; N, 7.29; S, 7.50. Calculated (percent): C, 64.9; H, 4.20; N, 8.41; S, 6.41.

EXAMPLE 6

Employing the same equipment and procedures as in Examples 4 and 5, the oligomer of Example 2 (Formula VII) was treated with hydrogen sulfide at room temperature and after only 15 minutes of reaction, a gel-like solution was obtained. This solution was further diluted with 200 ml. hot cresol and then precipitated as before into acidified methanol. The ethanol extracted polymer, after drying, weighed about 5.2 grams (100% theoretical yield) and had an intrinsic viscosity of 0.75 dl./gram. The following analyses of the product indicated that it was composed of recurring structural units of the formula

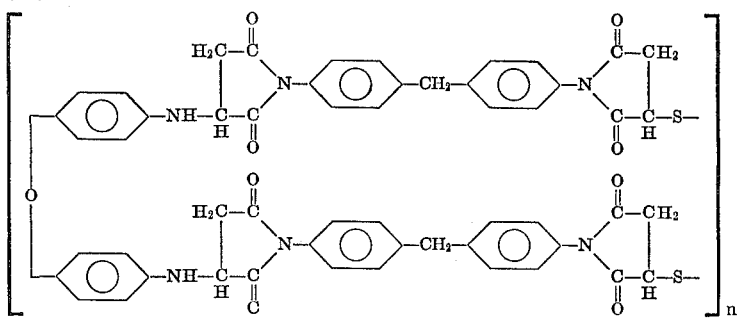

where $n$ is a whole number greater than 1. Found (percent): C, 68.1; H, 4.4; N, 8.7. Calculated (percent): C, 68.21; H, 4.42; N, 8.84.

EXAMPLE 7

To a reaction vessel equipped with stirrer and thermometer were added 30 ml. cresol and 9.1295 grams (0.01 mol.) of the oligomer of Example 1 (Formula VI). This mixture was warmed to about 60° C. to dissolve the oligomer and then the mixture was allowed to cool to around room temperature (about 27° C.) at which time 0.9419 gram (0.01 mol) ethanedithiol and 3 drops tri-n-butylamine were added. The mixture was allowed to stir for about 2½ hours during which time the viscosity of the solution increased greatly. The polymer was isolated by pouring the viscous solution into methanol containing a small amount of acetic acid. The polymer which precipitated was then ground, washed with hot ethanol and dried in a vacuum oven to yield 9.7 grams (96% theoretical) of a polymer having an intrinsic viscosity of 0.41 dl./gram and composed of recurring structural units of the formula

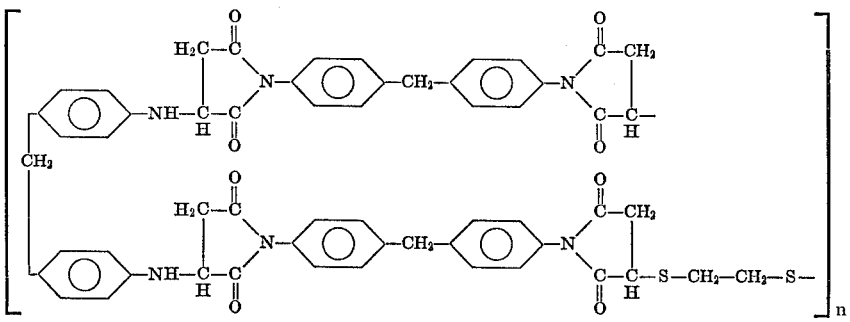

where $n$ is a whole number in excess of 1.

Analysis of the polymer established that it was composed of the above units as evidenced by the following results. Found (percent): C, 67.9; H, 5.0; N, 8.1. Calculated (percent): C, 68.1; H, 4.41; N, 8.36. Although the polymer had a melting point above 300° C., it was soluble in dimethylformamide and films from this solvent could be cast quite readily to yield products which were tough and flexible.

EXAMPLE 8

Employing the same procedure and equipment as used in Example 7, 9.1295 grams (0.01 mol) of the oligomer of Example 1 (Formula VI), 30 ml. cresol, 2.0641 grams (0.01 mol), 1,10-decamethylene dithiol and 3 drops tri-n-butylamine were mixed together and allowed to react at ambient temperature for about 15 hours. The polymer which was obtained on precipitation when the reaction mixture was worked up similarly as in Example 7, was washed and dried to give 10.7 grams (95.67% theoretical) of a resin having a softening point of 220-230° C. and intrinsic viscosity of 0.34 dl./gram. A film of this polymer cast from dimethylformamide was found to be tough and flexible. Tests on this film established that the yield stress was 11,400 p.s.i.; ultimate strength 10,400 p.s.i.; and ultimate elongation 6.5%. This polymer was composed of recurring structural units similar to that of Formula XII with the exception that the terminal portion of the recurring unit

—S—CH$_2$—CH$_2$—S— was replaced by a terminal portion of the recurring unit of the formula

—S—(CH$_2$)$_{10}$—S—

The identity of this polymer was established by NMR and infrared spectroscopy and the following analyses. Found (percent): C, 69.8; H, 5.8; N, 7.9. Calculated (percent): C, 64.2; H, 4.14; N, 7.48.

EXAMPLE 9

Employing the same conditions and procedures as in Example 7, 2.1028 grams (0.01 mol) ethylene glycol dimercaptoacetate and 3 drops tri-n-butylamine were added to 9.0094 grams (0.01 mol) of the bisimide oligomer of Example 2 (Formula VII) dissolved in 25 ml. cresol. The mixture was allowed to stir at ambient temperature and after ½ hour the reaction mixture became highly viscous and was thereafter worked up in the same manner as described in Example 7 to yield 10.1 grams (91% of theoretical) of a polymer having a softening point in the range of 212-242° C. Films cast from this polymer using dimethylformamide as a solvent showed a yield stress of 10,200 p.s.i.; ultimate strength 7,200 p.s.i.; and ultimate elongation 24%. This polymer which had an intrinsic viscosity of 0.30 dl./gram was identified in its structure by the following elemental analyses. Found (percent): C, 64.9; H, 4.8; N, 7.5. Calculated (percent): C, 64.2; H, 4.14; N, 7.48. This polymer was composed of recurring structural units as in Formula XI with the exception that the sulfur at the terminal end of each recurring unit was replaced by the unit —S—CH$_2$—$\overset{\overset{O}{\|}}{C}$—O—CH$_2$—CH$_2$—O—$\overset{\overset{O}{\|}}{C}$—CH$_2$—S—

EXAMPLE 10

Employing the same procedures and equipment as in Example 7, a polymeric composition was prepared whereby the oligomer described in Example 2 (Formula VII) was reacted with 2.0461 grams (0.01 mol) 1,10-decamethylenedithiol. The reaction was allowed to proceed for 45 minutes at ambient temperature after which the usual workup of the polymer was employed to give a resin in a yield of about 10.2 grams (93% theoretical) having an intrinsic viscosity of 0.32 dl./gram. Films cast from this polymer using dimethylformamide as the solvent had the following values: yield stress 11,000 p.s.i.; ultimate strength 9630 p.s.i.; ultimate elongation 36%. Analyses of the polymer showed that it was composed of recurring structural units similar to those of Formula XI in Example 6 with the exception that the terminal sulfur of the recurring unit was replaced by the —S—(CH$_2$)$_{10}$—S— radical. Following are the analyses of the polymer. Found (percent): C, 68.4; H, 5.7; N, 8.2. Calculated (percent): C, 65.11; H, 6.10; N, 8.76.

The polymers of Formula I can be treated by suitable means to form other polymers containing a sulfone linkage. Thus the polymer of Formula I can be dissolved in a suitable solvent, for instance, benzene, toluene, acetic acid, etc. and thereafter treated with an oxidizing agent employing a sufficient amount of the oxidizing agent to convert each sulfur in the recurring unit of Formula I to the sulfone (—SO$_2$—) grouping. Such polymers will have the general formula (XIII)

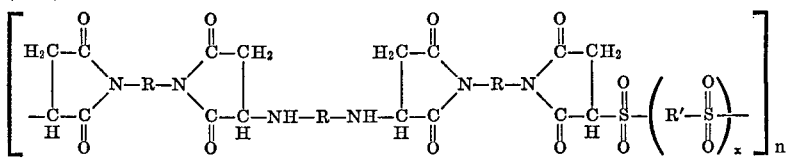

where R and R', x and n have the meanings given above.

The oxidation reaction is generally conducted by heating the mixture of the polymer of Formula I with the oxidizing agent for a period of time and at a temperature (for example, from 1 to 5 hours at a temperature of from 50° to 100° C.) until the desired polymer is obtained. The polymer can then be worked up and isolated in the same manner as was done in connection with the preparation and isolation of the other sulfur polymers of Formula I.

A typical example whereby a sulfone polymer of Formula XIII can be obtained is shown by the following.

About 5 grams of the polysulfide polymer of Formula X derived and prepared in accordance with Example 5 is placed in a reaction vessel equipped with a stirrer. Thereafter, 30 ml. glacial acetic acid is added and then 10 ml. of 30% hydrogen peroxide. The reaction mixture is stirred and heated at 60-65° for about 3 hours. The polymeric product which is obtained is removed by filtration and dried to give a polysulfone polymer composed of recurring structural units of the requisite formula where each sulfur is converted to the sulfone (—SO$_2$—) group.

As pointed out previously the reaction between the oligomer and the sulfide may be carried out in an emulsion medium. Typically, such an emulsion medium will comprise the oligomer, advantageously a catalyst, a proton donor, a solvent (especially one which can also act as a proton donor), and a sufficient amount of water to make the emulsion sufficiently fluid to permit reaction between the oligomer and the sulfide and still allow the formed polymer to be readily dispersed in the emulsion as it is formed. Usual emulsifying agents, such as carboxymethyl hydroxyethyl cellulose, can be employed for forming the emulsion.

Polymers obtained by this emulsion method can be expected to have higher molecular weights and higher intrinsic viscosities. Problems concerned with the viscosity of the reaction medium are usually avoided since the polymer is in the form of suspended, very fine particles in a nonviscous medium. The polymer obtained from the emulsion method can be expected to precipitate as a fine, powder which is easily washed and dried. Emulsions of the polymers are stable for long periods of time and could be employed for many applications in this physical state.

The compositions of the present invention have application in a wide variety of physical shapes and form, including the use as films, molding compounds, coatings, etc. When used as films or when made into molded products, these polymers, including laminated products prepared therefrom, not only possess good physical properties at room temperature but they retain their strength and excellent response to work-loading at elevated temperatures for long periods of time. Films formed from the polymeric compositions of this invention may be used in application where films have been used previously. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for containers and container linings, in laminating structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures. Films made from these compositions of matter can also serve in printed circuit applications.

Alternatively, solutions of the compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the curable compositions of the present invention as overcoat on other types of insulation is not precluded.

Applications which recommend these resins include their use as binders for asbestos fibers, carbon fibers, and other fibrous materials in making brake linings. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well known in the art. In addition, various heat-resistant pigments and dyes may be incorporated as well as various types of inhibitors depending on the application intended.

The compositions herein defined may suitably be incorporated in other materials to modify the properties of the latter or in turn their properties may be modified by the incorporation of the other material. For example, they may be compounded with substances such as natural or synthetic rubbers; synthetic resins such as phenol-aldehyde resins, urea-aldehyde resins, alkyd resins, etc.; cellulosic material such as paper, inorganic and organic esters of cellulose such as cellulose acetate, cellulose ether; such as methyl cellulose, ethyl cellulose, benzyl cellulose, etc. In some instances, plasticizers and other modifying agents may be used in combination therewith to yield products which when applied to a base member and air dried or baked have a high degree of heat-resistance due to the presence of the compositions herein defined.

It will of course be apparent to those skilled in the art that in addition to the compositions specifically referred to in the foregoing examples, other organic dithiols, oligomers, solvents, catalysts, proton donors, of Formula II, many examples of which have been described above, may be employed without departing from the scope of the invention. The processing techniques may be varied widely employing the many conditions recited previously.

What I claim as new and desire to secure by Letters Patent of the United States is:

1. A polymeric composition compound of recurring structural units of the formula

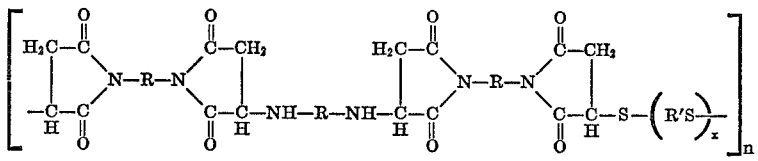

where the R is the same or different divalent organic radical selected from the class consisting of divalent hydrocarbon radicals of from 1 to 40 carbon atoms and divalent groups consisting of two aryl residues attached to each other through the medium of a member selected from the class consisting of an alkylene radical of from 1 to 10 carbon atoms,

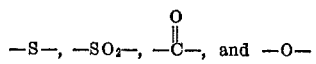

R' is a divalent alkylene radical of from 2 to 20 carbon atoms, x is 0 or 1, and n is a whole number in excess of 1.

2. A polymeric composition as in claim 1 wherein the recurring structural unit is

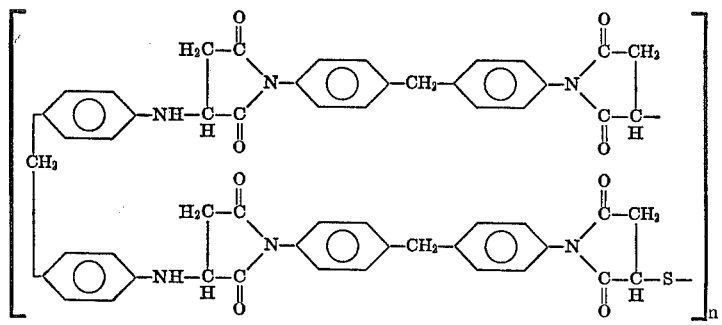

where *n* is a whole number in excess of 1.

3. A polymeric composition as in claim 1 wherein the recurring structural unit is

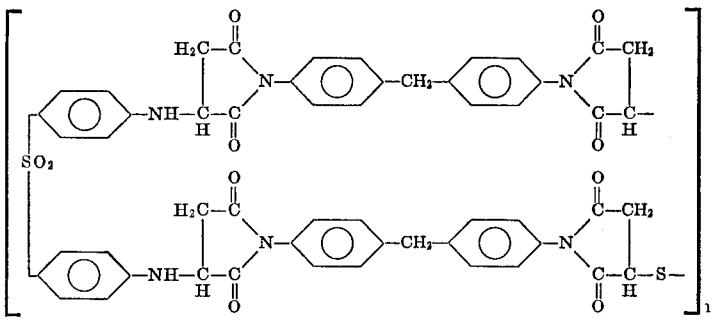

where *n* is a whole number in excess of 1.

4. A polymeric composition as in claim 1 wherein the recurring structural unit is

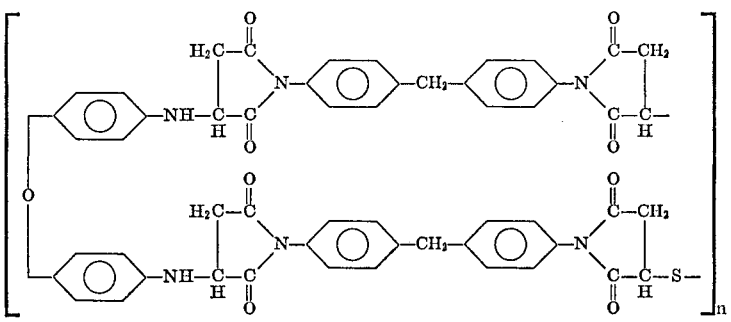

where *n* is a whole number in excess of 1.

5. A polymeric composition as in claim 1 wherein the recurring structural unit is

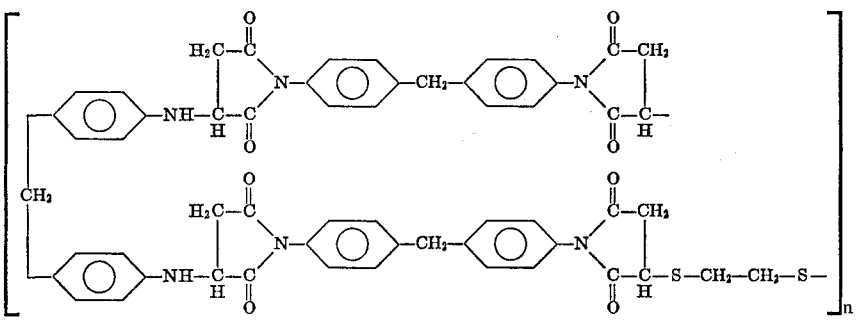

where *n* is a whole number in excess of 1.

6. A polymeric composition as in claim 1 wherein the recurring structural unit is

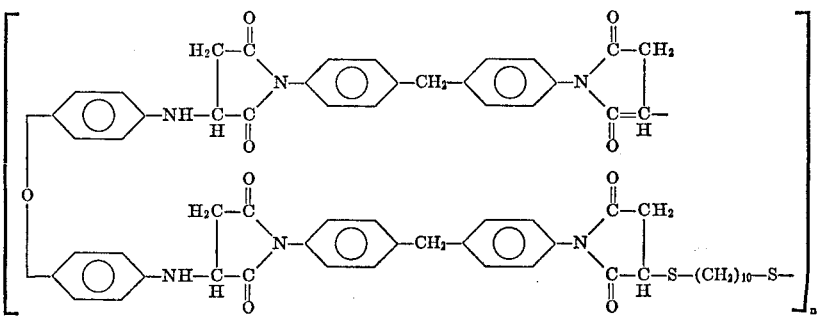

where *n* is a whole number in excess of 1.

7. The process for making a polymeric composition composed of recurring structural units of the formula

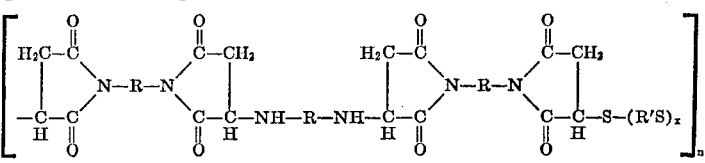

which process comprises effecting reaction, in the presence of a proton donor, between a maleimide of the general formula

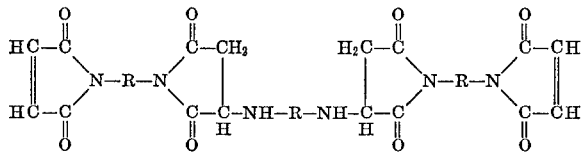

with a sulfide selected from the class consisting of hydrogen sulfide and organic dithiols of the general formula

HS—R'—SH where R is the same or different divalent organic radical selected from the class consisting of divalent hydrocarbon radicals of from 1 to 40 carbon atoms and divalent groups consisting of two aryl residues attached to each other through the medium of a member selected from the class consisting of an alkylene radical of from 1 to 10 carbon atoms,

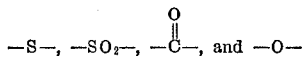

R' is a divalent alkylene radical of from 2 to 20 carbon atoms, $x$ is 0 or 1, and $n$ is a whole number in excess of 1, the proton donor being present in an amount to at least 0.5%, by weight, based on the weight of the maleimide, and the proton donor is any compound, organic or inorganic, capable of ionizing to give a proton and selected from the class consisting of inorganic acids, organic carboxylic acids, organic compounds containing weakly acidic hydrogen atoms in the form of nuclearly bonded hydroxyl groups, acidic inorganic salts and acidic organic salts.

8. The process as in claim 7 wherein the sulfide is hydrogen sulfide.

9. The process as in claim 7 wherein the sulfide is ethanedithiol.

10. The process as in claim 7 wherein the sulfide is ethylene glycol dimercaptoacetate.

11. The process as in claim 7 wherein the sulfide is 1,10-decamethylene dithiol.

References Cited

UNITED STATES PATENTS

| | | | |
|---|---|---|---|
| 3,625,912 | 12/1971 | Vincent et al. | 260—30.2 |
| 3,627,780 | 12/1971 | Bonnard et al. | 260—326.3 |
| 3,637,901 | 1/1972 | Bargain et al. | 260—830 |
| 3,669,930 | 6/1972 | Asahara et al. | 260—47 |

WILLIAM H. SHORT, Primary Examiner

L. L. LEE, Assistant Examiner

U.S. Cl. X.R.

117—72, 126 AB, 128.4, 161 UN, 228; 161—197, 205, 227; 260—4 R, 4 AR, 9 R, 17 R, 29.2 N, 29.6 HN, 30.2, 30.8 DS, 32.6 N, 33.4 P, 33.6 UA, 33.8 UA, 41 N, 47 CP, 63 N, 78 UA, 79, 326.3 824 EP, 841, 851, 857 UN, 873, 897 R